May 10, 1927.
N. NIX
1,628,058
METERING PUMP
Original Filed Feb. 5, 1925    4 Sheets-Sheet 3
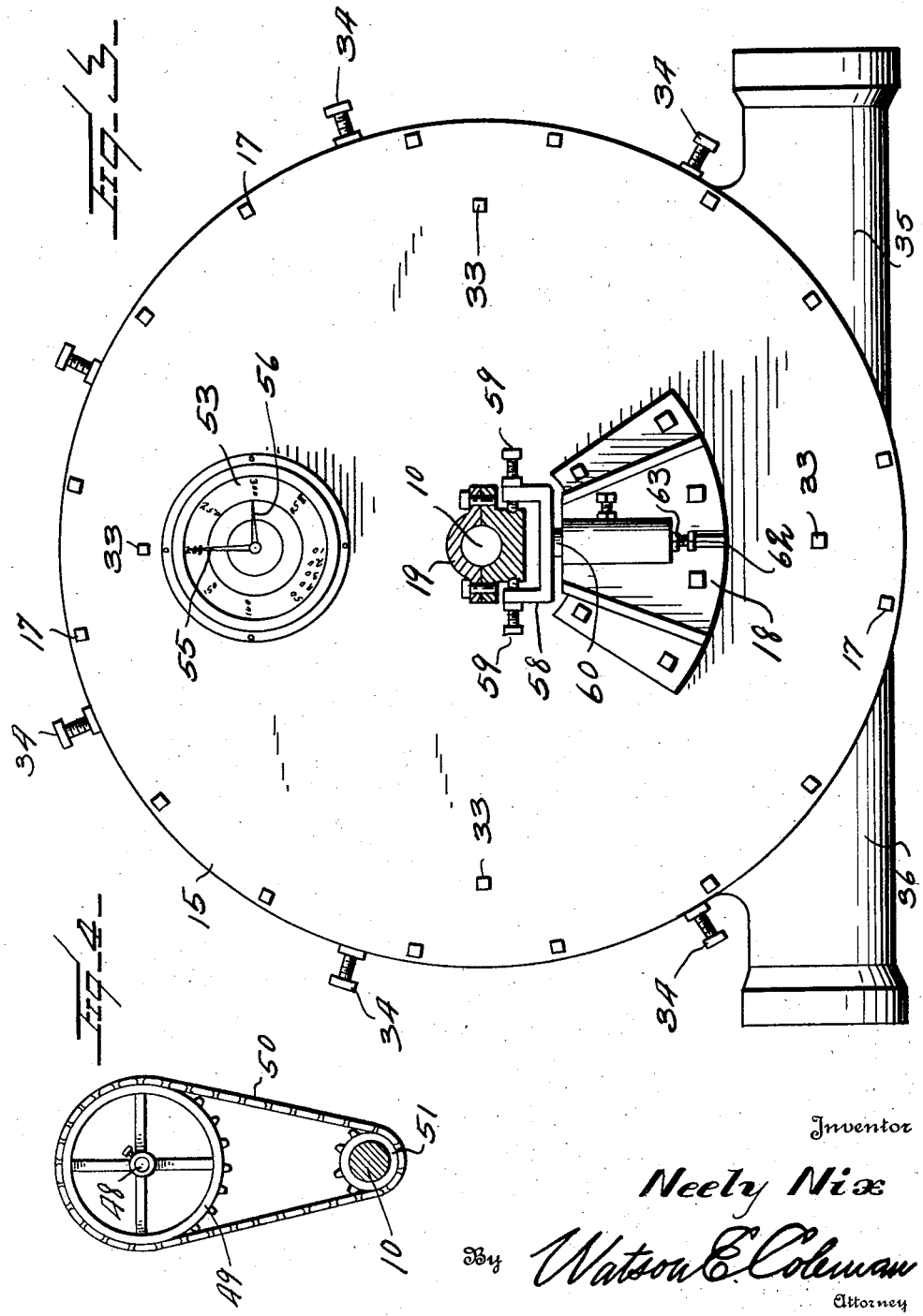
Inventor
Neely Nix
By Watson E. Coleman
Attorney

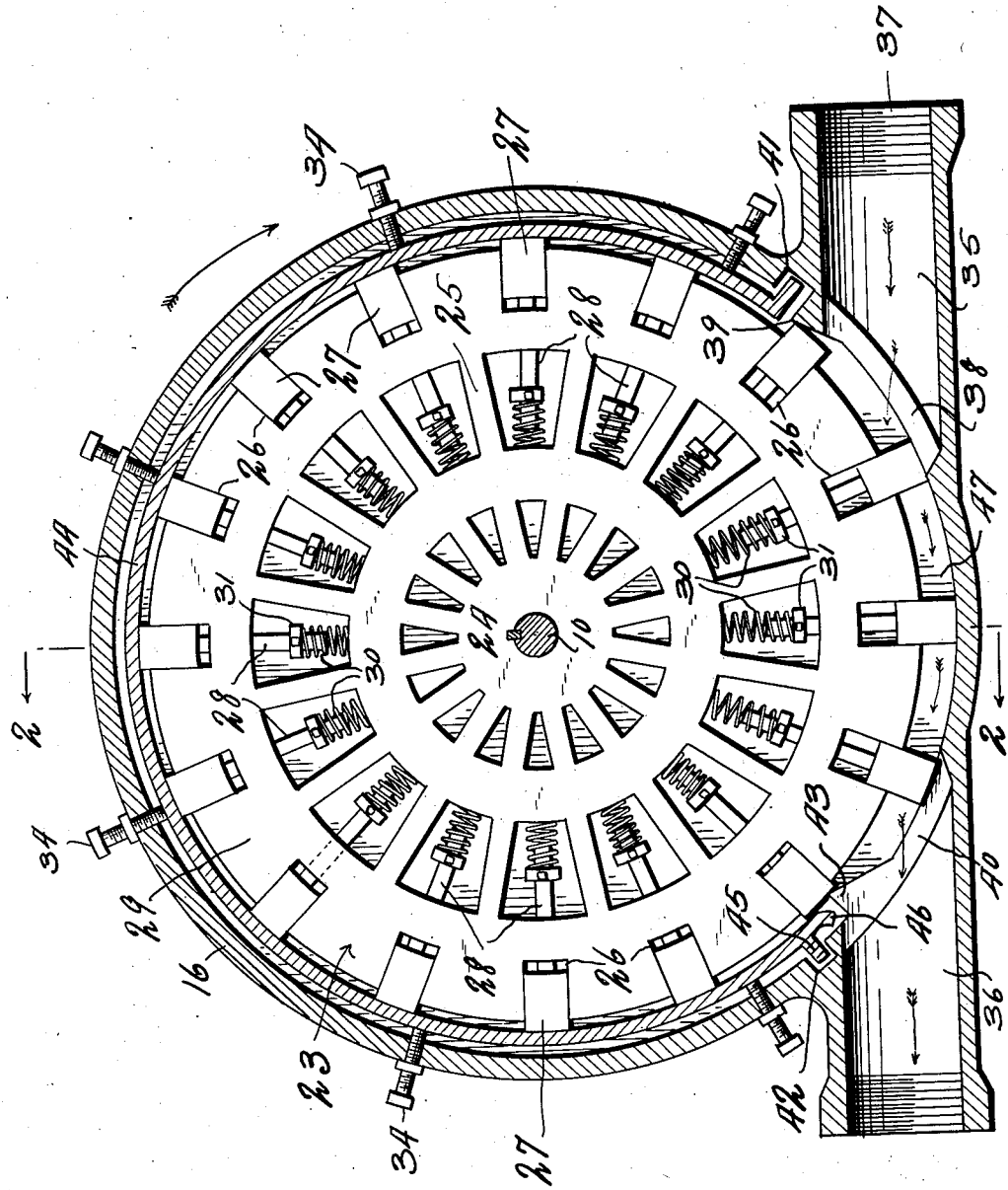

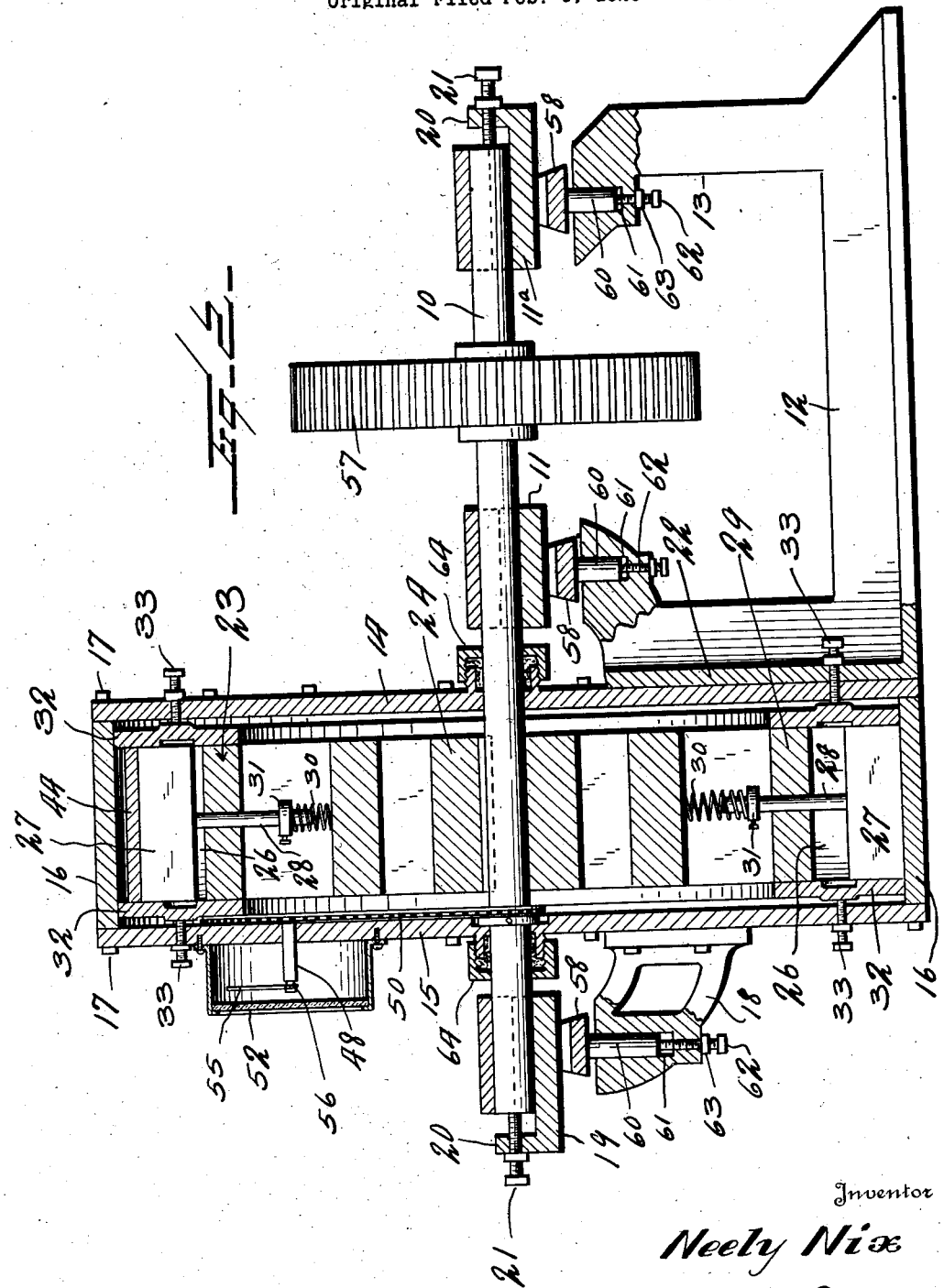

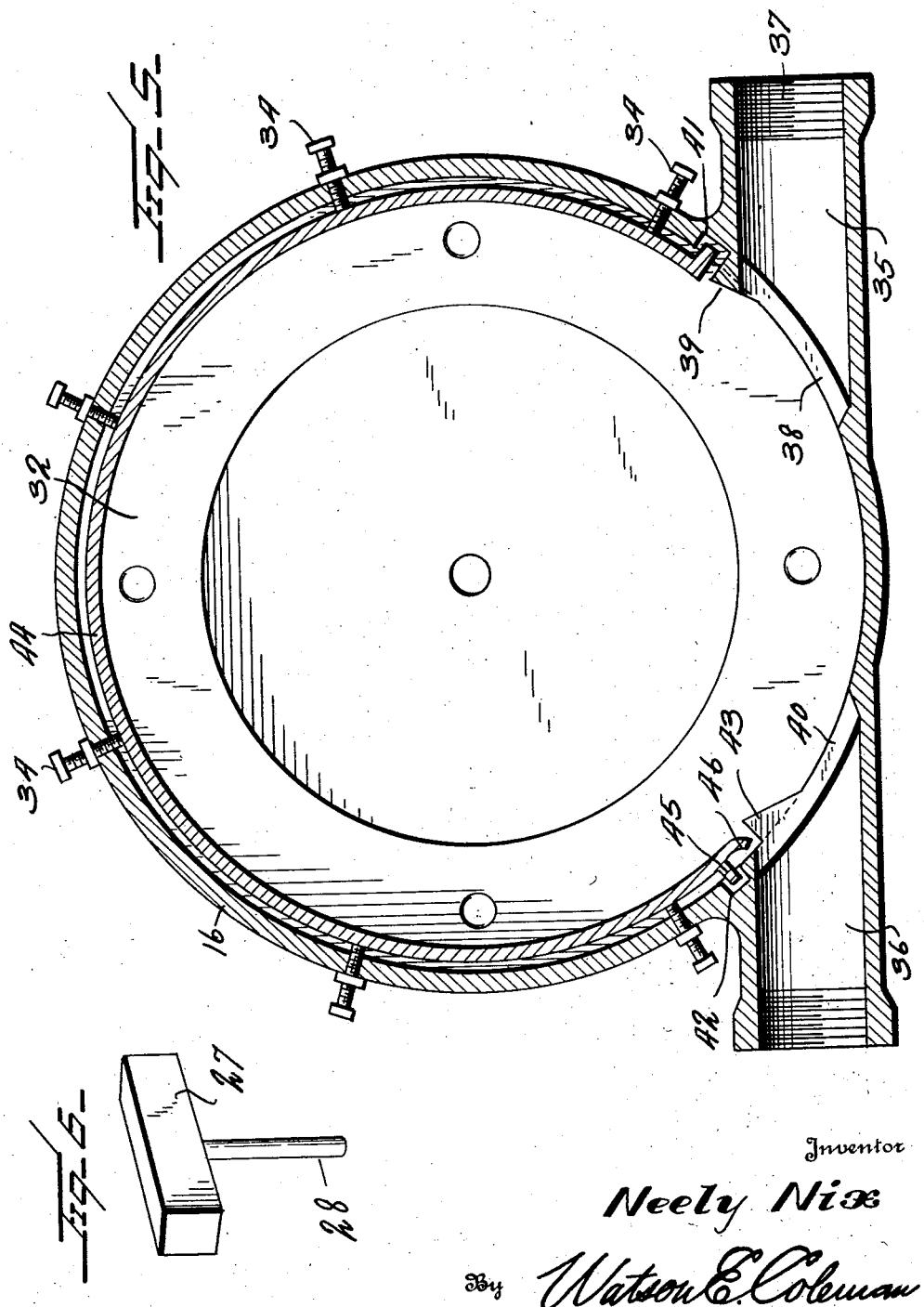

Patented May 10, 1927.

1,628,058

UNITED STATES PATENT OFFICE.

NEELY NIX, OF LONG BEACH, CALIFORNIA, ASSIGNOR, BY DIRECT AND MESNE ASSIGNMENTS, OF TWO-THIRDS TO M. R. HUMPTON AND ONE-THIRD TO B. A. STONE, BOTH OF LONG BEACH, CALIFORNIA.

METERING PUMP.

Application filed February 5, 1925, Serial No. 7,189. Renewed October 23, 1926.

This invention relates to devices for measuring or metering oil, water or other liquids.

A further object is to provide a device of this kind which is in the nature of a pump and which, when operated, will cause the propulsion of a certain amount of liquid through the pump and will at this time measure the amount of liquid so passed through.

A still further object is to provide a device of this character including a rotor having outwardly projecting blades or impellers which impel liquid through the pump, these blades being spring-projecting against the periphery of a portion of the pump, and in this connection to provide means whereby oil or other liquid cannot pass around the body of the pump but is held to that portion of the pump through which the oil or other liquid is designed to pass.

Another object is to provide means whereby the oil is prevented from flowing around the sides of the rotor.

Still another object is to provide means for supporting the shaft of the rotor and adjusting the shaft so as to properly adjust the rotor within its casing.

A further object is to provide means whereby the rotations of the rotor may be registered upon a dial.

While this invention is particularly designed as an oil pump for measuring oil, it is obvious that it need not be limited thereto and might be used for measuring other liquids.

My invention is illustrated in the accompanying drawings, wherein:—

Figure 1 is a vertical longitudinal sectional view through a metering pump constructed in accordance with my invention;

Figure 2 is a section on the line 2—2 of Figure 1;

Figure 3 is a side elevation of the construction shown in Figure 1;

Figure 4 is a detail view showing the manner in which the shaft of the rotor is connected to the shaft of the revolution counter;

Figure 5 is a vertical sectional view on the same plane as Figure 1 but with the rotor removed;

Figure 6 is a perspective view of one of the rotor blades;

Referring to these drawings, it will be seen that my improved pump comprises a central shaft 10 which is mounted in bearings 11 upon a base 12, these bearings 11 being supported by standards 13. At one end of the base 12 there is disposed a casing consisting of the end plates 14 and 15 and a circumferential wall 16. The end walls 14 and 15 and the circumferential walls are held together by screws, bolts or any other suitable means, screws 17 being indicated for this purpose.

The shaft 10 extends through the walls 14 and 15 and on the wall 15 there is bolted a supporting bracket 18 supporting a bearing 19 for one end of the shaft. The end bearing 11 and the bearing 19 are both formed to provide upwardly extending lugs 20 within which screws 21 are disposed, these screws being adjustable to shift the shaft 10 in its bearings and within the casing. The end wall 14 of the casing is bolted to flanges 22 on one of the standards 13, as shown in Figure 2.

Mounted upon the shaft 10 for rotation therewith is a rotor 23. This rotor comprises a central hub portion 24 and the outwardly projecting spokes 25. I do not wish to be limited to any particular construction of this rotor, but I wish to make it as light as possible consistent with strength. The periphery of the rotor is formed with a plurality of evenly spaced recesses 26 which extend entirely across the rotor, and disposed within these recesses are the blades 27. Each of these blades has a shank 28 which extends through a radial bore in the rim 29 of the rotor and into the space between this rim 29 and the hub 24. A spring 30 is mounted upon the hub 24 and engages a collar 31 on the corresponding stem or shank 28 and resiliently urges each blade 25 outward. Thus all of the blades are urged against the periphery of the rotor, the tension of any particular spring being dependent upon the adjustment of the collar 31.

The rotor is less in width than the casing formed of the members 14 and 15 and less in diameter than the wall 16, and disposed between the ends of the rotor and the end walls 14 and 15 are the annular packing plates 32. These, as before remarked, bear against the end faces of the rotor and one of these packing plates can be adjusted inward by means of the set screws or packing screws 33 disposed at intervals through the outer wall 14. By turning up these packing screws, it will be obvious that it will urge the adjacent plate 32 against the end face of the rotor and shift the rotor against the other packing plate 32 and this is permitted by adjusting the shaft 10 through the medium of the screws 21.

Intersecting the chamber formed by the walls 14, 15 and 16 and illustrated as intersecting this chamber at the lowest portion thereof is the inlet passage 35 and the outlet passage 36, the walls of these passages being formed preferably integral with the outer casing as, for instance, with the wall 16. The wall of the inlet pipe 35 is screw-threaded, as at 37, whereby it may be connected to a source of oil, water or other liquid, and the outlet pipe is also screw-threaded to be connected to an outlet duct of any suitable character.

Extending across the opening of the passage 35 and forming a continuation of the curve of the peripheral wall 16 are guides 38, the upper ends of these guides being inwardly enlarged, as at 39. At the inlet end of the outlet 36 there are also provided the guides 40 between which liquid passes. The guides 38 terminate at the upper wall of passage 35 and are spaced from the beginning of this portion of the peripheral wall 16, as at 41, and the guides 40 also terminate short of the peripheral wall 16 so as to leave a space 42, and instead of these guides 40 being enlarged at their upper ends there are formed triangular projections 43 adjacent the upper ends of the guides.

Disposed within the peripheral wall 16 and between this peripheral wall and the periphery of the rotor is an oil ring 44 adjustable by screws 34. This ring extends around the greater portion of the circumference of the rotor and terminates adjacent the recesses 41 and 42. This oil ring is formed with lugs 45 which extend down into the recesses 41 and 42 and that end of the oil ring adjacent the triangular lug 43 is extended to form a tongue 46. This inner face is curved downward below the apex of the triangular lug 43. The triangular ends 39 of the guides 38 extend up to a point approximately level with the inside face of the oil ring. It will thus be seen that as the rotor rotates in a clockwise direction, as shown by the arrow, the blades will engage the inner face of the oil ring and travel thereover until each blade comes to the extremity of the ring disposed within the recess 41. At this point the blade will slip off of the oil ring and slip onto the inner outwardly curved face of the portion 39 and the guides 38 and travel along these guides, trapping a certain amount of oil in front of the guides and forcing this oil along the passage 47, discharging it through the guides 40. The blade then travels inward on the guides 43 and slips off onto the inner face of the oil ring and agains travels around the inner face of the oil ring until it again reaches the point 39. Thus it will be seen that these blades act as pump blades to draw in oil through the passage 35 and force the oil along the passage 37 and out through the passage 36, and that as these blades are evenly spaced apart a certain definite quantity of oil must be discharged through the passage 36 at each revolution or fraction of a revolution of the rotor.

For the purpose of registering the amount of oil delivered from this pump or meter, I provide a registering device including a shaft 48 carrying upon it a sprocket wheel 49. Over this sprocket wheel passes a chain 50 and this chain passes over the sprocket wheel 51 mounted upon the shaft 10. Both these sprocket wheels and the sprocket chain are illustrated as being disposed between the end wall 15 and the packing plate 32 on that side. Thus these gears are entirely housed and dust is prevented from havinig access thereto.

The shaft 48 is concentric to the housing 52, and disposed within this housing 52 is any suitable registering device. I do not wish to be limited to the particular registering device used, but I have illustrated a device having two dials 53 and 54 and having two hands 55 and 56 operating over these dials. It will be obvious that the dial will indicate not only the total amount of oil which has passed through the meter but also the amount which may pass through it in one operation. Thus, for instance, if a person desires to buy gas and needs, say five gallons, the meter may be operated a certain number of revolutions or until the hand on the register has indicated that five gallons have been delivered. The shaft 10 may be operated by any suitable means as, for instance, by hand if the device is used at filling stations for the purpose of discharging and metering the oil, but I have illustrated for this purpose a gear wheel 57 by which power may be transmitted to the shaft 10. Any other suitable means for this purpose might be provided.

While I do not wish to be limited to any specific means for mounting the shaft 10 and for adjusting this shaft, I have illustrated the upper end of both of the standards 13 as supporting the bearings 11 and 11$^a$, the bearing 11$^a$ having an upwardly extending flange 20 through which the screw 21 is disposed, as previously described, these screws bearing against the ends of the shaft 10. The bearings 11 and 11$^a$ and the bearing 19 are supported in yokes 58 having screws 59 on each side which engage the corresponding bearing and hold the bearing in place within the yoke, each of these yokes having a centrally disposed spindle 60 extending into a socket 61 formed in the upper end of each of the standards 13 and in the bracket 18, and operatively engaging the lower end of this spindle for adjustment is an adjusting screw 62. This adjusting screw is held in its adjusted position by a lock nut 63 or any other suitable means. Each bearing 11 is formed, as usual, of upper and lower sections held together by clamping bolts, and with this construction it will be seen that the bearings may be raised or lowered by means of the screws 62 and longitudinally adjusted by means of the screws 21, these adjusting screws being held in their adjusted positions by means of lock nuts as described. Thus the rotor may be correctly centered within the rotor casing and thus the rotor may be disposed in an absolutely vertical plane so that there will not be unequal wear on the bearings. The side plates 14 and 15 immediately surrounding the flange are externally screw-threaded, and engaging this flange are the packing nuts 63, these packing nuts fitting the shaft snugly and acting to prevent any possible extrusion of oil around the shaft and through the central opening in the rotor casing through which the shaft passes. With this construction also it is obvious that any slack may be taken up in the chain 50. This pump and metering device might be used for the pumping of water or other liquids and at the same time act to measure the liquids.

I do not wish to be limited to the particular details of construction, as these might be modified in many ways without departing from the spirit of the invention.

I claim:—

1. A metering and pumping mechanism of the character described including an outer cylindrical casing having an inlet passage intersecting the casing tangentially and an opposed outlet passage intersecting the casing tangentially to the periphery of the casing, a rotor mounted within the casing, a flexible, arcuate packing member disposed between the casing and the rotor and extending from the beginning of the inlet passage around the rotor to the end of the outlet passage, a plurality of adjusting means mounted upon the periphery of the casing in circumferential series and engaging said packing member whereby it may be shifted toward or from the rotor, spring-projected blades mounted upon the rotor and engaging the inner face of the packing member as they travel over the packing member and the inner face of the casing between the ends of the packing member, guides extending across the inlet and outlet openings and against which the extremities of the blades bear, and means for guiding the blades over the inner face of the packing member to the inner face of the casing at the inlet opening and from the inner face of the casing to the inner face of the packing member adjacent the outlet opening.

2. A metering and pumping mechanism of the character described including an outer cylindrical casing having side walls and a peripheral wall, the casing at one point having an inlet opening and an inlet extension and at an opposite point having an outlet opening and an outlet extension, both said extensions being tangential to the periphery of the casing, spaced guides extending across said outlet and inlet openings but permitting the passage of water between the guides, the guides being curved to conform to the curvature of the peripheral wall, there being a recess at the ends of the guides remote from each other, a shaft passing through the casing and adjustable transversely thereof, a rotor mounted upon the shaft and adjustable with the shaft, the rotor having equidistant recesses in its periphery, spring-projected blades disposed in said recesses and urged toward the peripheral wall of the casing, packing plates disposed against each face of the rotor, screws passing through one wall of the casing and bearing against the adjacent packing plate whereby to adjust this packing plate against the face of the rotor and shift the rotor toward the other packing plate, a resilient, arcuate packing member extending concentric to the face of the rotor from the inlet to the outlet and terminating at said recesses and having lugs extending into the recesses, said guides having inclined protuberant portions extending inward to a point in line with the inner face of the packing ring, means disposed around the periphery of the casing whereby the packing ring may be adjusted inward.

In testimony whereof I hereunto affix my signature.

NEELY NIX.